Patented Jan. 13, 1942

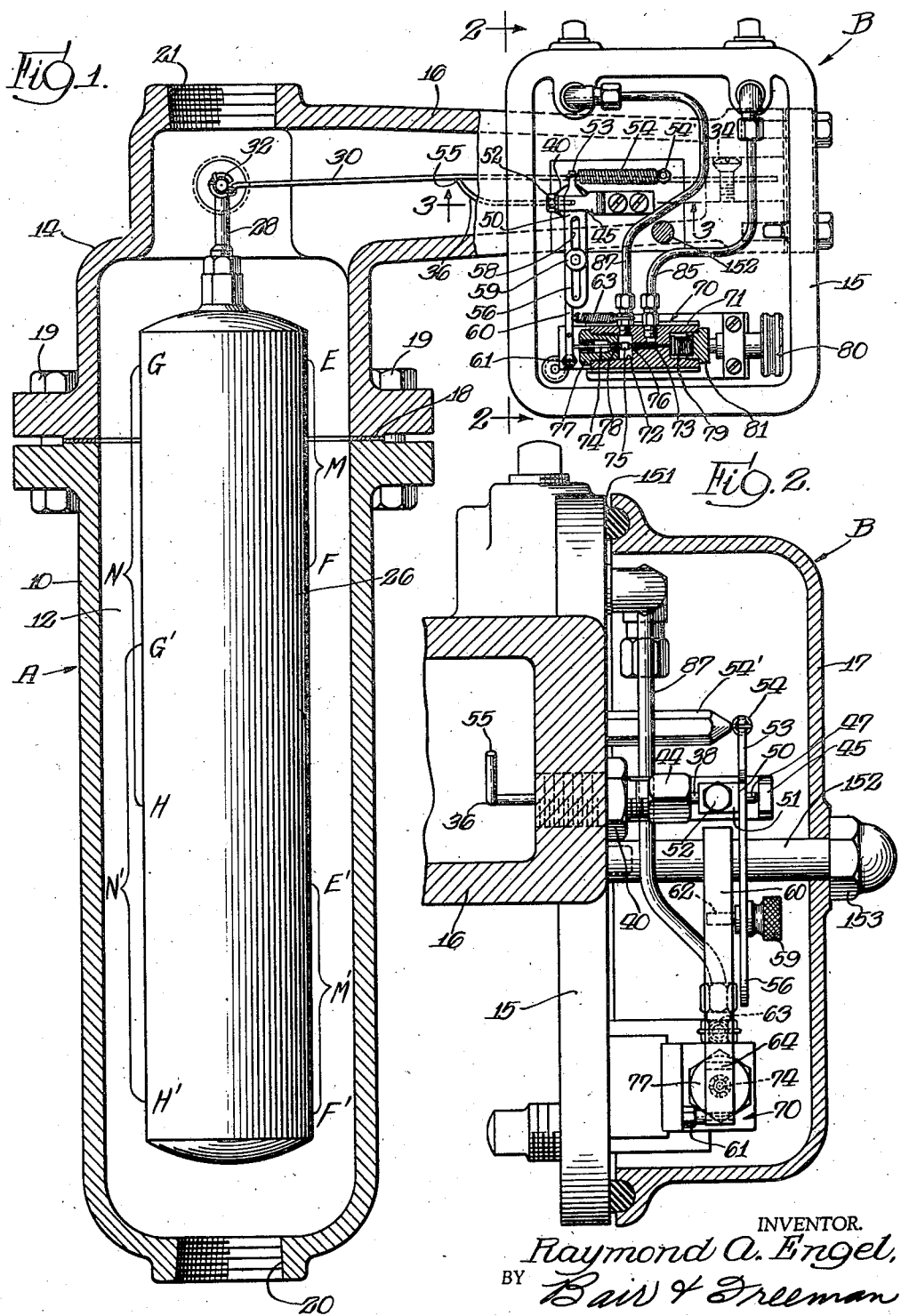

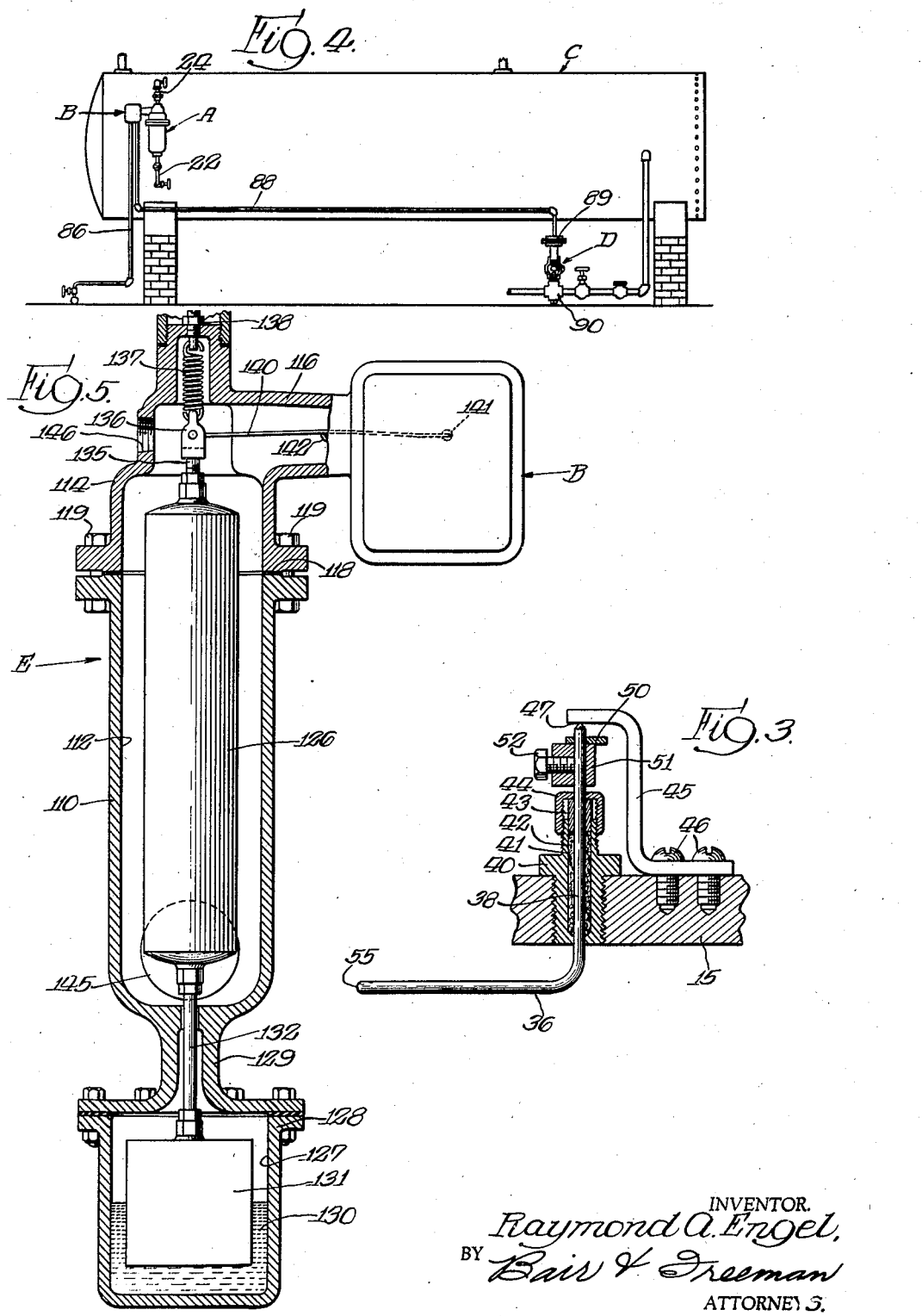

2,269,846

UNITED STATES PATENT OFFICE 2,269,846

LIQUID LEVEL CONTROL

Raymond A. Engel, Marshalltown, Iowa, assignor to Fisher Governor Company, Marshalltown, Iowa, a corporation of Iowa Application September 19, 1938, Serial No. 230,655

15 Claims. (Cl. 137—68)

My invention relates to liquid level controls and particularly those of a sort designed to maintain a desired liquid level in a large vessel such as an accumulator.

Among the objects of my invention is the provision of a liquid level control which is actuated by the differences in the weight of liquid displaced and which is provided with a transmitting mechanism adapted to actuate in turn an appliance for controlling the flow of liquid.

Another object is the provision of a new and improved liquid level control having a chamber for the liquid in which is suspended an element which is buoyed up by the liquid but not floated thereby and which moves in response to changes in liquid level so that the motion thereof may be transformed in a suitable manner so as to operate a device for controlling the liquid level.

Another object is the provision of a new and improved liquid level control having a chamber for the liquid in which is suspended an element which is buoyed up by the liquid but not floated thereby, and which moves in response to changes in liquid level so that the motion thereof may be transmitted by a suitable linkage to a pilot valve directly responsive to the changes in liquid level, which is in turn adapted to control a main valve suitable for controlling the flow of liquid to or from a container in response to the activity of the liquid level control.

Still another object is the provision of a new and improved liquid level control which features a form of weighted float suspended in a well supplied with liquid wherein the suspending means takes the form of an arm movable in response to the buoyant effect of liquid upon the weighted float, there being supplied a suitable linkage responsive to movement of the arm for transferring said movement to a valve mechanism for controlling the liquid level.

A further object is the provision of a liquid level control supplied with a type of weighted float connected by a suitable linkage to a valve mechanism for controlling the liquid level which mechanism comprises a system of levers, spring-pressed into contact, one with another, so that as the float level changes, the linkage system will follow it and correspondingly vary the valve control mechanism; it being also the object to incorporate in the linkage system adjustable features whereby the amplitude of movement may be varied in accordance with changing conditions without altering the construction of the control.

A still further object is the provision in a liquid level control of a transmitting mechanism including a system of levers and pilot valves, all housed within a weatherproof and properly vented container provided with a suitable connection for attaching a conductor to convey waste gas from the pilot mechanism to a remote point for disposition thereof.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a side elevation partially in section showing the weighted float and the external mechanism.

Figure 2 is an enlarged view partially in section taken on the line 2—2 of Figure 1.

Figure 3 is a detailed section of the journalled bearing taken on the line 3—3 of Figure 1, looking in the direction of the arrows and drawn to a slightly larger scale.

Figure 4 is a diagrammatic view showing the location of the liquid level control on an accumulator.

Figure 5 is a longitudinal view of a modified form of my device partially in section, showing a different type of weighted float and mounting therefor.

In many instances it is desirable to have a liquid level controller which will control the level of a liquid within relatively wide limits. These limits may be wider than those possibly obtained by the conventional type of liquid level controller and may be in practice as much as 14 to 30 inches or more. The purpose of allowing the wide range in level from fully opened to entirely closed positions of the controlled valve is to decrease the instantaneous effect upon the controlled valve of small changes in uncontrolled flow, while at the same time the controlled valve must respond if the change in uncontrolled flow persists. In other words, if a level controller is maintaining liquid level in a vessel within very close limits, as for example, 1 or 2 inches, a small change in uncontrolled flow will result in enough level variation to cause a relatively large movement of the controlled valve with a correspondingly large variation of controlled flow, inasmuch as little storage space is being used to iron out the flow change causing the original level variation.

In the case of the level controller utilizing a wide range a considerable variation is permitted in the level, consequently considerable storage space is available, and a more gradual rate of change at the controlled valve is obtained for a given rate of change in the uncontrolled flow, inasmuch as temporary changes in uncontrolled flow are absorbed by the relatively large storage space being utilized, and not reflected directly to the controlled valve. However, after a period of time the controlled valve must move as much as the changing conditions demand since the input over a period of time must always equal the output. However, the instantaneous value of change on the controlled valve will be considerably less in the case of the level controller using a wide range of level, due to the storage space that is utilized to iron out the fluctuations.

In order to build a control which is not too bulky but at the same time capable of operating under such wide limits, it is necessary to reduce the magnitude of movement to a relatively small amount while at the same time keeping it in a correct proportion.

Heretofore various float means have been provided which have been made directly responsive to changes in liquid level with a suitable reduction made by some mechanical or other means. The present device contemplates using the weight of the displaced liquid resulting in a buoyant effect to institute changes in the relative position of parts of the mechanism connected thereto. The operation, however, is based upon the principle of the weight of the liquid displaced rather than upon the direct change of the liquid level. In order to accomplish this, a weighted float is provided which is slightly heavier than the weight of a corresponding volume of the liquid displaced so that there is a balance between the two. In a device of this sort, a change in the level of the liquid will produce a corresponding change in the volume of liquid displaced by the weighted float and correspondingly change the pull of the weighted float upon a suitable suspending means. It is in a sense measuring the weight of liquid and transferring that measurement to a suitable mechanism. In this manner the weighted float is caused to move only a relatively short distance but in direct proportion to the change in liquid level. Because of the small movement of the weighted float, a simple and convenient linkage can be supplied in order to transfer the motion to a suitable valve device.

In the embodiment chosen to illustrate my invention, I have shown a liquid float control having a body A housing a weighted float member and attached thereto a weatherproof and properly vented housing B within which movable parts of the mechanism are contained. The body A is adapted to be attached by means of a pipe line to a liquid container, such as the accumulator. The pilot housing B is adapted to be connected to an auxiliary supply of clean dry air or gas maintained at a constant pressure, as for example, 20 pounds per square inch, and also by means of a second connection to a liquid valve mechanism D. Liquid is admitted to the body A filling it to a level corresponding to the level of liquid in the accumulator C and this liquid in turn affects the position of a weighted float contained therein, the motion of which is transferred to a mechanism within the housing B which in turn controls the activity of the liquid valve D positioned in a pipe line which controls the flow of liquid to the accumulator.

The body A of the control comprises a lower portion 10 forming a well 12 and a cap portion 14 which has a lateral extension 16 offset therefrom. A sealed connection is made between the lower portion 10 and the cap portion 14 by means of a gasket 18 with bolts 19 being used to hold the parts together. There is a threaded opening 20 at the bottom of the well and another threaded opening 21 at the top of the cap through which fluid is conducted to and from the interior. Attached to the hollow extension 16 is the housing B comprising a back plate 15 and cover plate 17.

As viewed in Figure 4, the lower opening 20 is connected by means of piping 22 to the accumulator C and a similar pipe 24 is used to connect the upper opening 21 to the accumulator at the upper side thereof. The connection is made in such a way that the position of the well 12 with respect to the accumulator is at about the normal level of the liquid contained therein indicated by the dotted line in Figure 4.

Within the well there is positioned a float 26 which is weighted preferably at the bottom in order to increase the weight of the float sufficient to barely submerge it in the fluid within which it is designed to operate—that is to say that the weight of the float when surrounded by liquid to the maximum height to which it will operate is slightly greater than the weight of the volume of liquid displaced. In a sense the weighted float is a liquid displacement member rather than a float since it actually sinks in the liquid.

The weighted float 26 is supported by means of a rod 28 which is connected to a resilient arm 30 forming a pivoted connection 32 therewith. The resilient arm 30, of substantial length, is secured within the lateral extension 16 by means of a screw 34. The resilient arm 30 actually suspends the weighted float within the well in such a manner that the arm is deflected downward at the point 32 by the weight of the float but not sufficient to permit the float 26 to rest on the bottom of the well 12. Therefore when liquid is admitted to the well, its buoyant effect upon the float will tend to lift it upwardly slightly and thereby reduce the amount the resilient arm 30 is deflected downward.

Motion of the resilient arm 30 is transferred to the mechanism within the housing B by means of a pivoted element 36 bent at right angles as shown in detail in Figure 3. The outwardly extending portion of the pivoted element, which will be termed the shaft portion 38, is pivotally mounted in the front wall of the lateral extension 16 in such a manner that it will rotate with the least possible amount of friction. The joint, however, must be sufficiently tight so that there will be no leakage of fluid through it from the inside. A threaded sleeve 40 is designed to receive the shaft portion 38 and is provided with a packing space 41 containing a light packing 42 held therein by means of a plug 43 pressed into place by a packing nut 44. A guard 45 consisting of a somewhat Z-shaped angle bracket is bolted to the front wall of the extension by the screws 46 and is designed to form a thrust bearing for the rod portion 38 at the point 47. The purpose of this is to prevent pressure within the body of the control from pushing the rod portion of the angle element outwardly.

It is to be understood, however, that where the situation warrants a ground packing joint made fluid tight with a lubricant may be used in place of the packing material 42 above described.

Attached to the outer end of the shaft portion 38 is a lever 50 forming part of the linkage by means of which motion of the weighted float is transferred to the mechanism within the housing B. The lever is attached to the shaft portion by means of a collar 51 and set screw 52 so that it will be forced to rotate with the pivoted element 36.

The lever 50 has an upwardly extending portion 53 to which is secured a coiled spring 54, which, together with parts of the device within the housing B, is seen to better advantage in Figures 1 and 2. One end of the spring 54 will be noted as fastened to a post 54' anchored on the back plate of the housing. The action of the spring is designed to continually urge the lever and consequently the pivoted element 36 in a clockwise direction as viewed in Figure 1. This action tends to constantly maintain an inward tip 55 of the pivoted element in contact with the resilient arm 30. The lever 50 has a downwardly extending portion 56 within which is a slot 58 and an adjusting screw 59 is mounted in the slot.

Cooperable with the lever 50 is a second lever 60 pivoted to a portion of the pilot valve body 71 at the point 61. The lever 60 extends upward to contact with an extension 62 of the adjusting screw 59 shown in dotted position on Figure 2 and is urged into contact therewith by means of a coiled spring 63 which continually tends to draw the lever 60 in a clockwise direction as viewed in Figure 1. By an arrangement of this sort, the levers forming the linkage and the angle element 36 are always urged resiliently into contact with each other and with the resilient arm 30. It is possible by shifting the screw 59 upwardly or downwardly in the slot 58 to change the mechanical advantage exercised by one lever upon the other and to correspondingly change the amplitude of its movement. There is further provision made for changing the position of the pivot 61 of the lever 50 from the position shown wherein the lever is one of a second class to another pivot point 64 wherein the lever is caused to operate as a first class lever.

The linkage system described is for the purpose of actuating a control or pilot valve generally designated by the numeral 70 which is made up of a body 71 within which is a valve chamber 72 and a central aperture 73 within which is mounted a valve stem 74 carrying a double seating valve 75. A valve seat 76 is provided in the body of the valve at the right hand side of the double seating valve and at the left there is provided a threaded plug 77 forming another valve seat 78 at the left of the valve. The valve seat 78 communicates with the atmosphere. It will be noted that the valve stem 74 is urged toward the left by means of a coiled spring 79.

The pilot valve 70 is mounted on a slide mechanism in such a manner that it may be moved to the right or to the left by rotating the handwheel 80. Lateral movement of the pilot 70, to which the lever 60 is pivoted, changes the relationship of the float position to the pilot valve position, and thus provides a means of adjusting the level at which the liquid in A is being controlled. Since the tubing 85 and 87 is ductile there will be no restriction of movement from this source.

Since the valve stem 74 is urged toward the left, it is constantly maintained in resilient contact with the lever 60 adjacent the pivot point 61. Here likewise there is provided means for continuously urging the movable parts into a spring-pressed contact position. As the weighted float 26 therefore raises and lowers, the motion is communicated by means of the resilient arm 30, the angle element 36 and the levers 50 and 56 in such a manner that the double seating valve 75 is moved toward the left or the right depending upon a corresponding movement of the weighted float.

The valve chamber 72 is connected on one side to a source of fluid pressure by means of a length of tubing 85 within the housing B which in turn is connected with a length of pipe 86 to some optional source of constant fluid pressure such as an air supply of 20 pounds per square inch. Connected also with the valve chamber is a length of tubing 87 which forms a communication between the valve chamber and a pipe 88 which is connected to the liquid valve device D, as best shown in Figure 4, which may be any one of several means of utilizing the pressure sent to it by means of the pilot valve.

In the embodiment illustrated the pipe 88 is directly connected to a diaphragm member 89, the diaphragm of which can be moved upwardly or downwardly in response to an increase or decrease of pressure within the pipe 88 to correspondingly change the setting of a liquid valve 90 which controls the flow of liquid to the accumulator C.

In operation the liquid level control device will be connected to a liquid container such as an accumulator C in the manner shown in Figure 4. If, for example, the liquid in the accumulator should be too low, liquid within the well 12 would be lowered thereby decreasing the buoyant effect upon the weighted float 26 causing it to descend a slight amount within the well. A slight movement downward of the weighted float 26 will cause the resilient arm 30 to move downward and press against the tip 55 of the pivoted element 36 thereby tending to rotate it in a counterclockwise direction. This movement in turn will cause the lower portion 56 of the lever 50 to move in a counterclockwise direction and since the support supplied by the extension 62 is thereby withdrawn from the lever 60, the coiled spring 63 attached thereto will tend to rotate the lever 60 in a clockwise direction about its pivot 61. This rotation will cause the double acting valve 75 to be shifted toward the right thereby decreasing the pressure upon the diaphragm member 89. The liquid control device D is constructed in such a manner that a corresponding decreasing of pressure upon the diaphragm will cause the liquid valve 90 to close thereby to prevent liquid from leaving the accumulator.

As the level within the accumulator C rises, there will be a corresponding rise in the liquid level in the well 12 causing the float to be surrounded and tending to buoy it upward a slight distance. This slight upward movement of the float 26 will correspondingly elevate the resilient arm 30 and tend to release pressure upon the tip 55 of the pivoted element 36. Due to the action of the coiled spring 54, the pivoted element 36 and the attached lever 50 will be shifted slightly in a clockwise direction. This action in turn by means of the extension 62 will cause the lever 60 to be pressed in a counterclockwise direction about its pivot 61 against the tension of the spring 63 and this action will tend to release the valve stem 74. With the valve stem released, the spring 79 will force the valve 75 a slight distance towards the left thereby moving said valve further from the seat 76 and permitting gas supplied through the tube 85 to pass into the valve chamber 72, at a faster rate thereby increasing the pressure in this chamber.

When the valve is opened only a slight amount some of this gas will escape past the valve seat 78 into the atmosphere, while a small amount of the gas will be conducted through the tube 87 to one side of the diaphragm member 89. As the valve 75 is moved a greater distance towards the left, an increasing amount of the gas will be conducted to the diaphragm member while a decreasing proportion of the gas will be allowed to escape past the valve seat 78. Eventually as the weighted float 26 rises to its upper limit, there will be a complete shut off of the valve 75 against the valve seat 78 thereby causing all of the gas to be conducted to the diaphragm member 89, increasing the pressure thereon to a maximum which causes a complete opening of the liquid valve 90 thereby preventing the liquid level within the accumulator from exceeding the upper limit.

Since liquid levels in a container of this sort may be allowed in practice to change over a wide range which may be as great as thirty inches or more, having in the apparatus provisions for adjusting the position of the level and the magnitude of the level change permitted, it becomes necessary when building a small and compact liquid level control to rduce the proportionate amplitude of voat movement in order to obtain a finished product having the overall compactness desired. In the embodiment of the invention shown, there has been provided what might be termed a weighted liquid mechanism, the action of which is in a predetermined proportion to changes in the liquid level in the accumulator, said action being cooperable with a novel transforming means for transmitting the effect of this relatively small movement to a device for controlling the flow of liquid to the accumulator.

Two adjustments are possible with a device of the class described, one of which relates to the throttling range of the pilot valve and the other of which determines at what liquid level the throttling action is to be effective. To more clearly explain the effect of these adjustments reference is had to the lettered characters adjacent the float 26 in Figure 1.

It may be assumed for example that the device has been set for what is known as a narrow throttling range, namely, a range between the liquid level limits E and F, which have a mean level at the point M. This means that when the liquid level reaches the point E the pilot valve is at one extreme position and when the liquid level recedes to the point F the pilot valve is at the opposite extreme position. The interval between the liquid level limits E and F can be varied in order to provide what may be termed a wider throttling range. This is accomplished by manipulation of the screw 59 which has the effect of changing the mechanical advantage of the lever system, as, for example, between the upper liquid level limit G and the lower liquid level limit H, which limits have a mean level at the point N.

By another adjustment it is possible to change the mean level M, for example, from its upper position to a lower position M'. To accomplish this, the position of the pilot valve is shifted to right or left by manipulation of the handle wheel 80. By so adjusting the position of the pilot valve the throttling range becomes effective at a mean liquid level which may vary anywhere between the points M and M' for example for the throttling range indicated by the liquid level limits indicated by the points E and F and E' and F'. The same adjustment may be made for a wider throttling range as for example by shifting the mean level N downward to a point N' for a throttling range indicated by the interval between the liquid level limits G and H.

An alternative arrangement of my device is shown in Figure 5. A means of this sort employs a control body E having a lower portion 110 and a cap portion 114 bolted together by means of a bolt 119 with a gasket 118 sealing the joint between them. The cap portion is provided as in the first instance with a lateral extension 116 and a float 126 is positioned within a well 112 formed in the lower portion of the body. In addition to the well 112, there is provided an auxiliary well 127 formed within an extension 128 joined to the lower portion 110 by a short hollow neck 129. The auxiliary well 127 is designed to be partially filled by a body of mercury 130. Within the auxiliary well is a liquid displacement member or float 131 which is designed to be supported upon the body of mercury. This liquid displacement member is connected by means of a shaft 132 to the lower end of the float 126 thereby forming a pair of floats, one above the other. At the upper end the float 126 is connected by means of a short shank 135 and eyelet screw 136 to a coiled spring 137 which in turn is secured at the top of the cap portion 114 by means of a screw 138. The resilient suspending means as described supports the pair of floats in their respective wells.

In this embodiment there is provided a rigid arm 140 lying within the lateral extension 116 which is pivotally mounted at the point 141 within the lateral extension in a position adjacent the housing B. At the other end the rigid arm 140 engages the eyelet screw 136 and is adapted to be lifted and lowered thereby in response to a lifting or lowering of the pair of floats. An angle element 142 of the sort described in connection with the preferred embodiment of my invention transfers motion of the rigid arm 140 to a suitable mechanism within the housing B. Liquid is admitted to and expelled from the well 112 through the lower aperture 145 while at the top there is provided an aperture 146 forming another connection thereto. The lower connection 145 would be made as shown in Figure 4 to the pipe 22 and the upper connection to the upper pipe 24.

In operation the weighted float provided with an auxiliary mercury floated member will operate in the same manner as the first noted embodiment of my invention with the additional feature of somewhat greater stability and sensitivity. A float device can be used having considerably greater weight which at the same time is extremely sensitive and flexible due to its being supported in part upon a body of mercury and in part upon a resilient support. Whatever liquid is used in the container, such as an accumulator, can be admitted to the well 112 filling it to its various levels and this liquid in turn will be supported above the body of mercury which due to its extremely heavy gravity will remain at the bottom of the auxiliary well. It is also to be borne in mind that the same type of resilient arm may be used in the embodiment shown in Figure 5 as has been shown and described in Figure 1, and that conversely in the embodiment of Figure 1 there could be supplied a coil of the character of Figure 5 with a rigid arm of the character of arm 140 cooperable therewith.

Due to the desirability of having the mechanism always operate properly and the necessity for operating the various parts through very small distances in order to obtain an extremely fine adjustment, the entire mechanism consisting of the moving parts outside the body of the control is housed within a sealed container described as the housing B to protect it from outside influences such as weather. This container consists of the cap 17 which is held against a pneumatic ring 151 forming a sealed connection between it and the outside wall of the body by means of a threaded post 152 and an acorn nut 153. The cap of course can be readily removed at any desired time to make changes in the adjustment of the device.

There has been described a liquid level control which is adapted to accurately maintain liquid levels within a container and which is operable over rather wide changes in said liquid level or which can be arranged to cause full opening in response to a change of but a small fraction of the maximum range. The apparatus provided is one capable of extreme ease of adjustment and capable of operating with a minimum of fluctuations in spite of spasmodic changes in the liquid level within the container.

I claim as my invention:

1. A liquid level control for a container comprising a body for the control having a portion thereof forming a liquid well, a liquid displacement member resiliently supported in the well, an arm attached to the member positionable in response to the position of the displacement member, linkage means cooperable with the arm comprising cooperable levers, one lever being in resilient contact with said arm and being resiliently held in contact with another of said levers and an adjustment of the point of contact between said levers for changing the movement of one with relation to movement of the other, a pilot valve device cooperable with said other lever, said lever being operable in response to movement of the displacement member to vary the adjustment of the valve device.

2. In a liquid level control for a container provided with a body for the control having a portion forming a liquid well, a liquid displacement member resiliently supported in the well and a pilot valve operated thereby, the combination of a control mechanism comprising an arm attached to the member positionable in response to the position of the liquid displacement member, linkage means cooperable with the arm comprising cooperable levers, resilient means holding one lever in contact with the arm and in adjustable contact with the second lever, said second lever having a connection with the pilot valve, a spring for resiliently urging said second lever in one direction, said second lever being operable in another direction in response to movement of the other displacement member to vary the adjustment of the valve.

3. In a liquid level control for a container provided with a body for the control having a portion forming a liquid well, a liquid displacement member resiliently supported in the well, a pilot valve device including a two-way valve, the combination of a valve control mechanism comprising an arm attached to the member positionable in response to the position of said member, linkage means cooperable with the arm comprising interengaging levers, one lever being resiliently held in contact with the arm and another lever having a pivot support on a stationary portion and having a resilient contact with the first, and an alternative pivot support for said one of said levers on the opposite side of the pilot valve to make provision for an arrangement of said parts to reverse the action of the pilot valve in response to normal action of the displacement member.

4. In a liquid level control mechanism for a container including a body for the control having a portion forming a liquid well, a weighted float in the well, and a pilot valve device, the combination of a control mechanism comprising an arm extending horizontally from the float and means for securing the arm to a point of contact within the body for supporting the float independently of the remaining portions of the mechanism, a pivoted element journaled in a packed bearing in the wall of the body having a portion within the body extending into contact with said arm and a portion outside the body rotatable in response to movement of the inside portion, a lever non-rotatably secured to the outside portion provided with a spring adapted to urge the lever rotatably in a direction to maintain contact with said arm, another lever pivoted to the body adjacent the pilot valve device and extending into contact with said first lever, a spring for said other lever for urging the parts into contact and means for adjustably shifting the point of contact between said levers to vary the effect of movement thereof on the valve.

5. A liquid level control for a container comprising a body for the control having portions forming a primary liquid well adapted to be filled with liquid from the container at a corresponding level and a secondary liquid well below the first adapted to be permanently filled with a body of auxiliary liquid to a predetermined level, a liquid displacement member suspended in the first well and a liquid displacement member attached thereto suspended in the secondary well so that both members normally tend to be buoyed up by the auxiliary liquid means for supporting said members jointly in position and lever means connected to said members adapted to convey motion therefrom in response to movement of said members.

6. A liquid level control for a container provided with a valve mechanism comprising a body for the control having portions forming a primary liquid well adapted to be filled with liquid from the container at a corresponding level and a secondary liquid well below the first adapted to be permanently filled with a body of auxiliary liquid to a predetermined level, a liquid displacement member suspended in the first well and a liquid displacement member attached thereto suspended in the secondary well so that both members normally tend to be buoyed up by the auxiliary liquid and by the container liquid at levels within range of the control, resilient suspending means for supporting said members jointly in position and lever means connecting said members with the valve mechanism adapted to convey motion to said mechanism in response to movement of said members.

7. A liquid level control for a container comprising a casing in the form of a hollow receptacle connected to the container forming a liquid well adapted to be partly filled with liquid, a laterally extending portion of said casing at the top of the well above the liquid level forming a hollow horizontal space communicating with said well, a liquid displacement member in the well having a specific gravity greater than the liquid, a horizontal arm of resilient material fixed at one end within said laterally extending portion and having the other end projecting into the top of the well forming a resilient support for the displacement member in the well and adapted to move up and down with the displacement member to different positions of control in proportion to the change in gravity effect upon said member due to changes in the amount of liquid displaced as a result of changes in the level of the liquid in said well, and means for transmitting the motion of said arm to a point outside the casing comprising an independent element pivoted in the casing having an end thereof held in contact with said arm and adapted to follow the movements thereof.

8. A liquid level control for a container comprising a casing in the form of a hollow receptacle connected to the container forming a liquid well adapted to be partly filled with liquid from the container, a laterally extending portion of said casing at the top of the well above the liquid level forming a hollow horizontal space communicating with said well, a liquid displacement member in the well having a specific gravity greater than the liquid and a resilient means secured to the casing within the top of said well for suspending said member therein, a horizontal arm movably supported at one end within said laterally extending portion and having the other end projecting into the top of the well into connection with the top of said displacement member and adapted to shift up and down with said member in proportion to the change in gravity effect upon said member due to changes in level of the liquid in said well, and means for transmitting the motion of said arm to a point outside the casing comprising an independent element pivoted in the casing spring pressed into contact with said arm and adapted to follow the movements thereof and transfer the same outside the casing.

9. A liquid level control for a container comprising a casing for connection to the container at the outside thereof having the form of a hollow cylindrical receptacle including separable sections bolted together in liquid-tight relation forming an elongated liquid well adapted to be partly filled with liquid from the container, said upper section having a laterally extending portion at the top of the well above the liquid level forming a hollow horizontal space communicating with said well, an elongated liquid displacement member in the well having a specific gravity greater than the liquid, a horizontal arm of resilient material fixed at one end within said laterally extending portion and having the other end projecting into the top of the well, a pivotal connection between said arm and the displacement member providing support for the said member in the well adapted to move up and down in proportion to the change in gravity effect upon said member due to changes in level of the liquid in said well, a control mechanism box forming part of said upper section and means for transmitting the motion of said arm to the control box comprising an independent element pivoted in the casing adjacent the box having an end thereof spring pressed into contact with said arm and adapted to follow the movements thereof and transfer the same to the mechanism within said control box.

10. A liquid level control for utilizing the changes in level of a liquid comprising a casing, a liquid displacement member in the casing, a horizontal arm attached to said member responsive to the movement thereof, a valve including a reciprocating valve stem adapted to be actuated in accordance with said movement and means for transferring movement from said arm to said valve comprising a pivoted element including a shaft portion rotatably secured in the casing, an inner angular portion in contact with the arm, a pair of connected levers having adjustable contacting elements to vary the mechanical advantage, one of said levers being secured to the shaft portion, a second of said levers being in contact with the stem of said valve, means for pivotally attaching said lever to the casing at one side of said valve stem for actuating the valve, said contacting element on one of said levers comprising a slotted portion and being provided with an adjusting screw projecting therefrom, said other contacting element comprising an extension in contact with the first and adapted to be engaged by said screw in various positions along the length thereof to vary the effect of motion of the first lever upon the second in response to movement thereof by the displacement member, a spring for holding said levers in contact one with another and a spring for urging said levers jointly in a direction wherein the pivoted element is constantly in contact with the horizontal arm.

11. In a liquid level control for a partially filled container including a pilot valve mechanism, the combination of a casing in the form of a hollow sealed receptacle connected to the outside of the container forming a liquid well adapted to be partly filled with liquid from the container, a liquid displacement member having a length in vertical direction in excess of any transverse dimension and having a specific gravity greater than the liquid positioned vertically in the well free from lateral support, said displacement member being immersed in said liquid at a level determined by the liquid level in the container, a resilient means within the sealed receptacle having a freely pivotal connection to the displacement member adapted to suspend said displacement member in the well and a mechanism having a portion thereof subject to the combined control of the displacement member and the resilient means, said mechanism forming a connection between said displacement member the pilot valve mechanism for setting the operative position of said pilot valve mechanism independently of said resilient means in direct response to the position of said displacement member.

12. In a liquid level control for a partially filled container including a free moving pilot valve mechanism, the combination of a casing in the form of a hollow sealed receptacle connected to the outside of the container forming a liquid well adapted to be partly filled with liquid of predetermined specific gravity from the container, a liquid displacement member having a length in excess of twice the diameter and having a specific gravity greater than the liquid positioned vertically in the well and free from lateral support, said displacement member being immersed in said liquid at a level determined by the liquid level in the container, a stationarily positioned single spring element within the sealed receptacle attached directly to the displacement member in axial alignment adapted to suspend said displacement member in the well and to limit the magnitude of its movement when subjected to changes in liquid level and a mechanism connected between said displacement member at a point adjacent the point of attachment of said spring and the pilot valve mechanism for setting the position of said pilot valve mechanism independently of said spring element by direct action of said displacement member in displaced position.

13. A liquid level control for a container provided with a valve mechanism, comprising a body for the control forming a liquid well adapted to be filled with liquid from the container to a corresponding level, a weighted float suspended in the well so as to buoyed up to an adjusted position determined by the quantity of liquid displaced, resilient suspending means within the liquid well for supporting the weighted float in position, and lever means supported independently of said suspending means including a resilient element normally urging said lever means into contact with the suspending means, said lever means being thereby adapted to follow the movement of the suspending means and the float, said lever means being connected in turn with the valve mechanism and adapted to actuate the same in response to movement of the float.

14. A liquid level control for a container comprising a casing in the form of a hollow receptacle connected to the container forming a liquid well adapted to be partly filled with liquid from the container, a laterally extending portion of said casing at the top of the well above the liquid level forming a hollow horizontal space communicating with said well, a liquid displacement member in the well having a specific gravity greater than the liquid, an inherently resilient supporting member for positioning the displacement member in the well, comprising a substantially horizontal arm having one end fixed to the casing within said laterally extending portion and having the other end projecting into the top of the well and connected with the top of said displacement member, said last end having a restricted up and down movement in proportion to the change in gravity effect upon said displacement member due to changes in level of the liquid in said well, pivotal means extending through the wall of said laterally extending portion attached to said supporting member for transferring movement of said supporting member outside of the casing.

15. A liquid level control for a container comprising a casing in the form of a hollow receptacle connected to the container forming a liquid well adapted to be partly filled with liquid from the container, a laterally extending portion of said casing at the top of the well above the liquid level forming a hollow horizontal space communicating with said well, a liquid displacement member in the well having a specific gravity greater than the liquid, a substantially horizontal arm having a pivotally fixed position at one end within said laterally extending portion and having the other end projecting into the top of the well and connected with the top of said displacement member, said last end having a restricted up and down movement in proportion to the change in gravity effect upon said member due to changes in level of the liquid in said well, pivotal means extending through the wall of said laterally extending portion attached to said arm for transferring movement of said arm outside of casing, and resilient means attached to the casing and said arm for resisting downward movement of the displacement member.

RAYMOND A. ENGEL.